US011031683B2

(12) United States Patent
Kraus et al.

(10) Patent No.: US 11,031,683 B2
(45) Date of Patent: Jun. 8, 2021

(54) REARVIEW MIRROR ASSEMBLY WITH ANTENNA

(71) Applicant: Gentex Corporation, Zeeland, MI (US)

(72) Inventors: Andreas Kraus, Baden-Wuerttemberg (DE); Christopher J. Koleszar, Zeeland, MI (US); Sebastien C. Jaeger, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 325 days.

(21) Appl. No.: 15/544,572

(22) PCT Filed: Jan. 19, 2016

(86) PCT No.: PCT/US2016/013860
§ 371 (c)(1),
(2) Date: Jul. 19, 2017

(87) PCT Pub. No.: WO2016/118481
PCT Pub. Date: Jul. 28, 2016

(65) Prior Publication Data
US 2018/0277940 A1 Sep. 27, 2018

Related U.S. Application Data

(60) Provisional application No. 62/105,262, filed on Jan. 20, 2015.

(51) Int. Cl.
*H01Q 1/32* (2006.01)
*B60R 1/04* (2006.01)
*B60R 1/12* (2006.01)

(52) U.S. Cl.
CPC ............. *H01Q 1/3266* (2013.01); *B60R 1/04* (2013.01); *B60R 1/12* (2013.01); *B60R 2001/1215* (2013.01); *B60R 2001/1261* (2013.01)

(58) Field of Classification Search
CPC .......... H01Q 1/3266; B60R 1/04; B60R 1/12; B60R 2001/1215; B60R 2001/1261; B60R 25/245
See application file for complete search history.

(56) References Cited

U.S. PATENT DOCUMENTS 5,614,885 A * 3/1997 Van Lente ................ B60R 1/04
340/12.28
5,798,688 A * 8/1998 Schofield ................ B60R 1/086
340/438
(Continued)

FOREIGN PATENT DOCUMENTS

CN 202138304 U 2/2012
EP 0860325 B1 11/2002
(Continued)

OTHER PUBLICATIONS

International Searching Authority, International Search Report and Written Opinion for PCT/US2016/013860 dated Apr. 14, 2016, 8 pages.

*Primary Examiner* — Dimary S Lopez Cruz
*Assistant Examiner* — Bamidele A Jegede
(74) *Attorney, Agent, or Firm* — Price Heneveld LLP; Bradley D. Johnson (57) ABSTRACT

A rearview mirror assembly includes a main housing defining an interior surface, an interior cavity at least partially bounded by the interior surface, and an open side. The assembly further includes a control module coupled within the interior of the main housing, a mirror coupled over the open side of the main housing, and an antenna electrically coupled with the control module and positioned within the interior cavity of the main housing.

20 Claims, 8 Drawing Sheets

(56) References Cited

U.S. PATENT DOCUMENTS

| | | | | |
|---|---|---|---|---|
| 6,011,518 A * | 1/2000 | Yamagishi | H01Q 1/3266 | 343/700 MS |
| 6,019,475 A * | 2/2000 | Lynam | B60R 1/0602 | 359/604 |
| 6,078,294 A | 6/2000 | Mitarai | | |
| 6,124,886 A * | 9/2000 | DeLine | B60Q 3/258 | 348/148 |
| 6,259,412 B1 * | 7/2001 | Duroux | B60R 1/12 | 343/711 |
| 6,278,377 B1 * | 8/2001 | DeLine | B60R 1/12 | 340/425.5 |
| 6,396,447 B1 * | 5/2002 | Jonasson | H01Q 1/3275 | 343/711 |
| 6,412,959 B1 * | 7/2002 | Tseng | B60R 1/12 | 345/7 |
| 6,433,748 B1 * | 8/2002 | Ekelund | H01Q 1/085 | 343/713 |
| 7,327,226 B2 | 2/2008 | Turnbull et al. | | |
| 7,471,193 B2 | 12/2008 | Brouwer et al. | | |
| 2002/0032510 A1 * | 3/2002 | Turnbull | B60R 1/12 | 701/49 |
| 2003/0107521 A1 * | 6/2003 | Matsuura | B60R 1/12 | 343/713 |
| 2004/0196179 A1 * | 10/2004 | Turnbull | G01S 5/0221 | 342/357.75 |
| 2004/0246607 A1 * | 12/2004 | Watson | B60R 1/12 | 359/872 |
| 2005/0078389 A1 * | 4/2005 | Kulas | B60R 1/04 | 359/871 |
| 2006/0097855 A1 * | 5/2006 | Turnbull | B60R 1/12 | 340/425.5 |
| 2006/0238318 A1 * | 10/2006 | Brouwer | B60R 1/12 | 340/435 |
| 2006/0250310 A1 * | 11/2006 | Yeh | H01Q 1/243 | 343/702 |
| 2006/0255960 A1 * | 11/2006 | Uken | B60R 11/02 | 340/815.4 |
| 2008/0103655 A1 * | 5/2008 | Turnbull | B60R 1/12 | 340/425.5 |
| 2009/0128432 A1 * | 5/2009 | Heo | G07B 15/063 | 343/713 |
| 2011/0156893 A1 * | 6/2011 | Hwang | B60R 1/12 | 340/442 |
| 2015/0123854 A1 * | 5/2015 | Chakam | H01Q 1/1214 | 343/702 |

FOREIGN PATENT DOCUMENTS

| | | |
|---|---|---|
| EP | 3221187 A | 5/2016 |
| JP | 2000509234 A | 7/2000 |
| JP | 2011066627 A | 3/2011 |

\* cited by examiner

REARVIEW MIRROR ASSEMBLY WITH ANTENNA

TECHNOLOGICAL FIELD

The present disclosure relates generally to a rearview mirror assembly for a vehicle. In particular, the rearview mirror assembly includes a communication module including an antenna mounted within with a housing thereof.

BACKGROUND

Various rearview mirror assemblies have been adapted to implement at least some functionality of a metering system useable in taxis, livery vehicles, and other "for-hire" driven vehicles. Such function may include metering and the corresponding calculation of a total fee due based on, for example, distance driven in light of a predetermined fare and potentially including various fees, taxes, and tips. Accordingly, further improvements may be desired to facilitate the payment of such fees using an adapted rearview mirror assembly.

SUMMARY

According to one aspect of the present disclosure, a rearview mirror assembly includes a main housing defining an interior surface, an interior cavity at least partially bounded by the interior surface, and an open side. The assembly further includes a control module coupled within the interior of the main housing, a mirror coupled over the open side of the main housing, and an antenna electrically coupled with the control module and positioned within the interior cavity of the main housing.

These and other features, advantages, and objects of the present device will be further understood and appreciated by those skilled in the art upon studying the following specification, claims, and appended drawings.

DETAILED DESCRIPTION OF EMBODIMENTS

Figure 1:
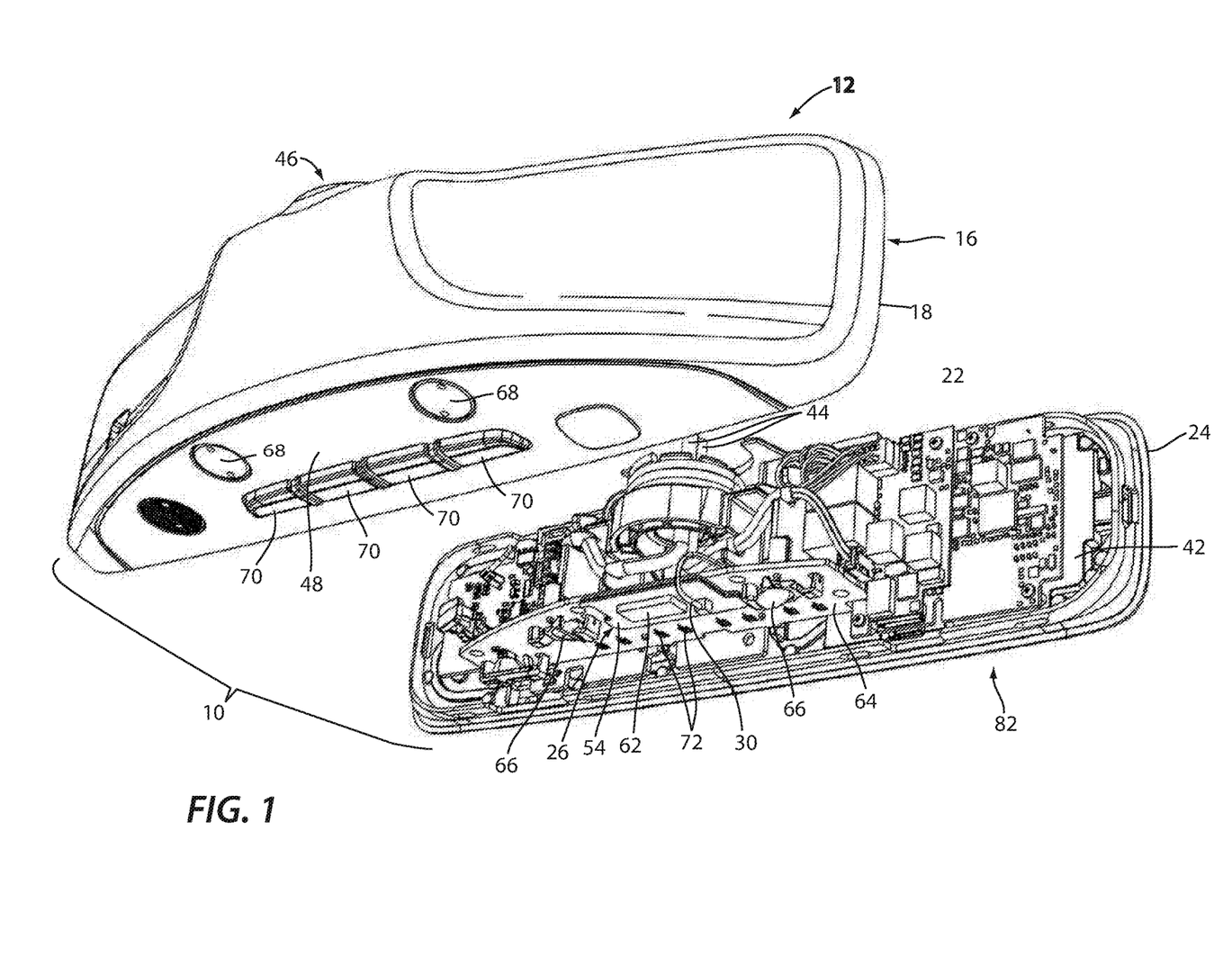
FIG. 1 is an exploded view of one embodiment of a rearview mirror assembly of the disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
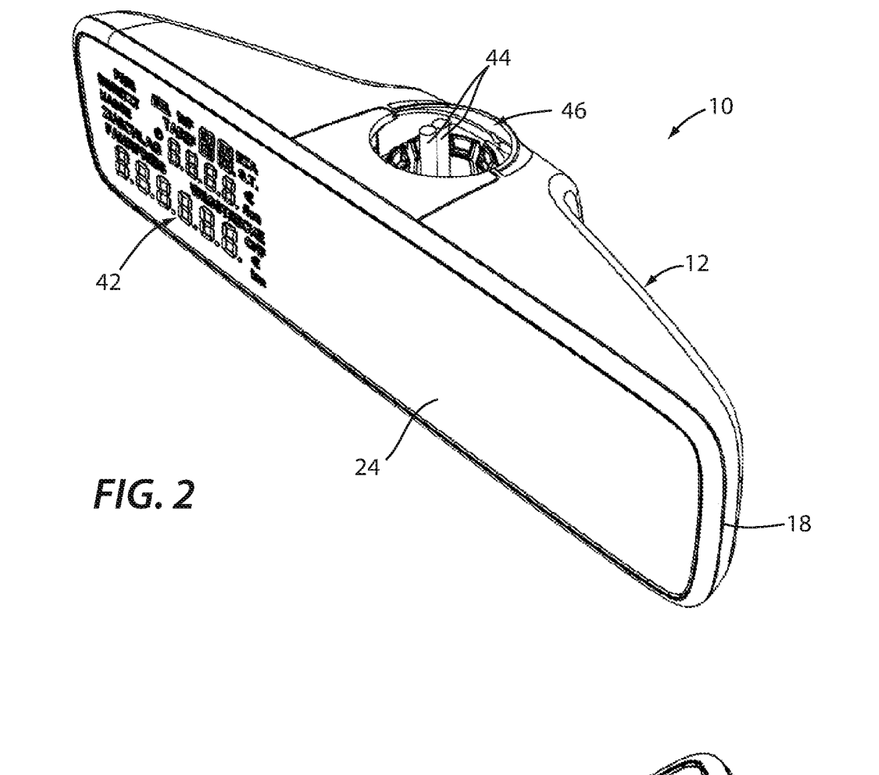
FIG. 2 is a front-top perspective view of the rearview mirror assembly of FIG. 1.
Figure 3:
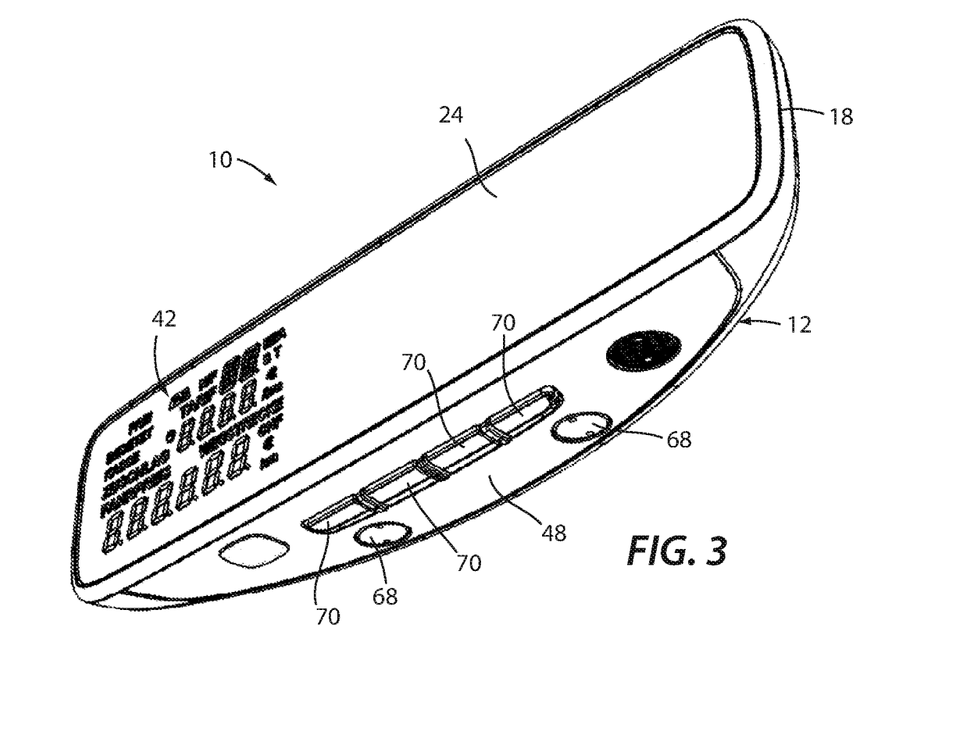
FIG. 3 is a front-bottom perspective view of the rearview mirror assembly of FIG. 1.

Referring now to FIGS. 1-3, reference numeral 10 generally designates a rearview mirror assembly. Rearview mirror assembly 10 includes a main housing 12 defining an interior surface 14, an interior 16 and an open side 18. Assembly 10 further includes a control module 22 coupled within the interior 16 of main housing 12 and a mirror 24 coupled over open end 18 of main housing 12. Assembly 10 also includes an antenna unit 26 electrically coupled with control module 22 (such as by cable 30) coupled within interior 16 of main housing 12 such as by coupling thereof with a portion of control module 22.

Figure 4:
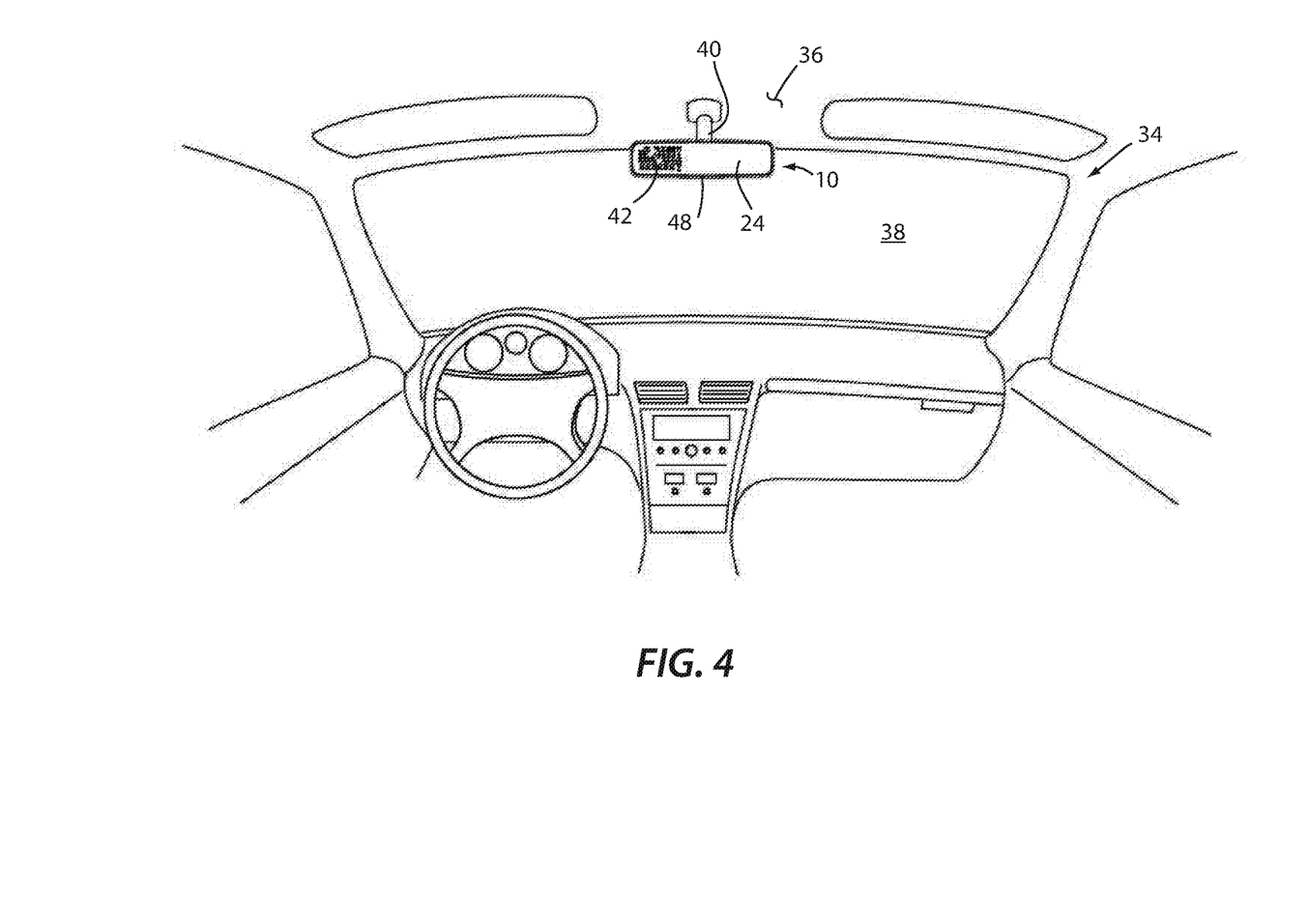
FIG. 4 is a partial view of an interior of a vehicle including the rearview mirror assembly of FIG. 1.

As shown in FIG. 4, rearview mirror assembly 10 can be used in an automobile interior 34 such as by coupling thereof with a headliner 36 in a position adjacent an upper portion of windshield 38 (or by being coupled with windshield 38 itself) by way of a mounting arm 40. In an example, rearview mirror assembly 10 can be in the form of a display mirror assembly, such as by incorporation of a full or partial display 42 into mirror 24. In a further example, rearview mirror assembly 10 can be specifically adapted for use within a taxi or other livery or "for-hire" vehicle. In this respect, display 42 can be configured to present relevant information for such use, including fare information and the like. In such an example, control module 22 can be adapted to receive and/or determine information to be presented on display 42, as well as to control display 42 so as to present such information thereon. Control module 22 can receive power, data, or the like by means of cables 44 passing through a mounting aperture 46 in main housing 12, which may further pass through mounting arm 40 to couple with power and/or control systems (not shown) of the vehicle associated with interior 34.

In an embodiment, antenna unit 26 can facilitate the use of rearview mirror assembly 10 as a stand-alone metering and payment module such that incorporation of rearview mirror assembly 10 alone into vehicle interior 34 can facilitate the use of the associated vehicle as a taxi or other similar vehicle. As such, antenna unit 26 can be in the form of a near-field communication ("NFC") antenna unit that is capable of communicating directly, or facilitating communication by another component (e.g. control module 22), with an external device that includes a compatible NFC chip. Such an "NFC enabled" device may include a specifically-adapted cellular or mobile telephone (such as a smart phone or the like), various other electronic devices, or a specifically-adapted credit card. Accordingly, a payment due, as calculated by control module 22 for example, and presented on display 42 can be made by a passenger or the like by positioning an NFC-enabled payment device within a sufficient distance (e.g. about 0.5 cm in to about 30 cm), whereupon control module 22, as facilitated by antenna unit 26, can communicate with the NFC-enabled payment device (not shown) to make such a payment, according to various processes known in the art.

The positioning of antenna unit 26 in the location depicted in FIG. 1 (as well as in FIG. 6), as described further below, may help provide for advantageous functioning of antenna unit 26. This advantageous functioning may include a desired range of communication with an external device, and may further allow for an antenna unit 26 that is of an appropriate size to fit within an available space within interior 16 of main housing 12. As further shown in FIGS. 1 and 6, positioning of antenna unit 26 toward lower side 48 of main housing 12 may provide a convenient location for the positioning of an external device during a payment action due to, for example, the accessibility of side 48 when positioned within vehicle interior 34 as shown in FIG. 4.

As shown in FIG. 3, rearview mirror assembly 10 may include a plurality of lenses 68 and buttons 70 within side 48 of interior surface 14, which may be related to other functions of rearview mirror assembly 10. The presence of such buttons 70 and lenses 68 (along with various internal features associated therewith) can reduce the available space within side 48 of interior surface 14, thereby making optimization of the function of antenna 26 desirable.

Figure 5:
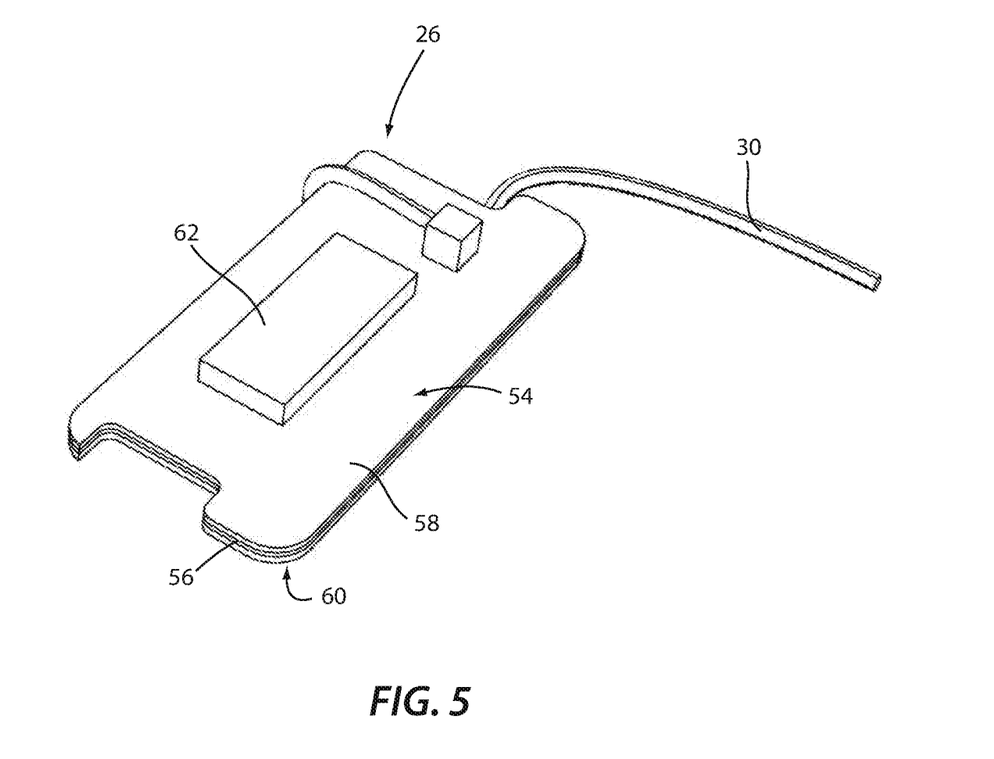
FIG. 5 is a front-perspective view of an antenna assembly included in the rearview mirror assembly of FIG. 1.
Figure 6:
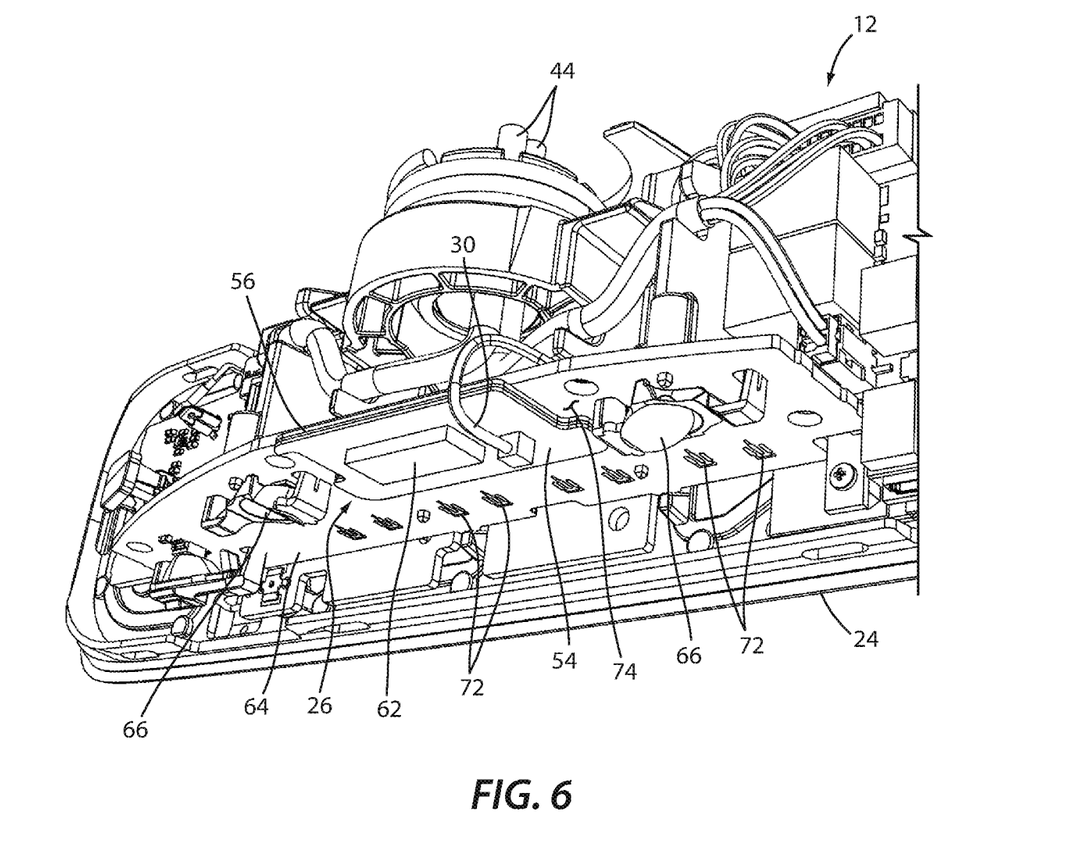
FIG. 6 is a detail view of the interior of the rearview mirror assembly of FIG. 1 showing a location of the antenna assembly of FIG. 5 with the housing.

Referring now to FIGS. 5 and 6, antenna unit 26 is shown as including an antenna body 54 in the form of a substrate of, for example, metal or other conductive material. The substrate of antenna body 54 generally defines a perimeter side wall 56 extending between a first face 58 and a second face 60. A communication chip 62 can be mounted on the substrate of antenna body 54 with at least portions thereof being electrically coupled with antenna body 54 such that antenna body 54 can receive electrical signals according to an appropriate protocol (e.g. NFC). Cable 30, which may be a coaxial wire, for example, can be electrically coupled with chip 62 to facilitate electrical connection between antenna unit 26 and control module 22.

To achieve the above-described positioning within interior 16 of main housing 12, antenna unit 26 can be coupled with generally any available structure of assembly 10 within a lower portion (i.e. adjacent lower side 48 of main housing 12) of interior 16. In the example shown in FIGS. 1 and 6, antenna unit 26 is coupled with a printed circuit board ("PC board") 64 that is positioned within interior 16 of main housing 12 adjacent bottom side 48 thereof when assembly 10 is in the fully-assembled configuration shown in FIGS. 2 and 3. In the illustrated example, PC board 64 can be a portion of control module 22 and can be specifically used to control and power light emitting diode ("LED") units 66 mounted thereto and used to provide a light source on lower side 48 of main housing 12 that is output through associated lenses 68 thereon. PC board 64 can also be used to receive input from buttons 70 by a plurality of switches 72 mounted thereon, buttons 70 themselves being coupled with PC board 64 or with main housing 12.

Due to the relative positioning of both lenses 68 and buttons 70 with respect to main housing 12, an open (i.e., unoccupied or otherwise absent of other features or components) area 74 may be present on PC board 64 between LED units 66 and switches 72. Antenna unit 26 may be coupled with PC board 64 within such open area 74, provided that open area 74 is of a suitable size to accommodate an antenna unit 26 having an antenna body 54 of an acceptable size to reliably transmit and receive signals. It is noted that features including lenses 68, buttons 70, or the like may be adjusted, re-arranged or moved with respect to main housing 12 to achieve a desirable size of open area 74. In an example, PC board 64 may define an open area 74 large enough to accommodate an antenna unit 26 with an antenna body 54 of between about 500 $mm^2$ and about 700 $mm^2$ (which does not need to be defined within a rectangle), or in an embodiment about 600 $mm^2$. Other sizes of antenna bodies 54 may be useable, depending on a number of factors, including the particular communication protocol used (e.g., NFC), the materials of main housing 12, the distance between PC board 64 and lower side 48 of housing 12, potential interference from other components of control module 22, or the like.

Antenna unit 26 can be coupled with PC board 64 by any acceptable means, such as bonding using adhesives, using mechanical fasteners, or the like. In one embodiment, antenna unit 26 may be coupled with PC board 64 using double-sided tape.

Returning to FIG. 3, the above-described mirror 24 (including display 42) and control module 22 (including PC board 64) can be coupled together in a subassembly 82 that can be assembled with main housing 12 in assembly 10. Such an arrangement can allow for assembly of antenna unit 26 onto PC board 64, in a step of completing subassembly 82, antenna unit 26 being then electrically coupled with the desired feature of control module 22 by cable 30. After such connection, subassembly 82 can be coupled with main housing 12, such as by a snap-fit arrangement, adhesive, or other fasteners. The entire resulting rearview mirror assembly 10 can then be assembled into a vehicle interior 34, as discussed above.

Figure 7:
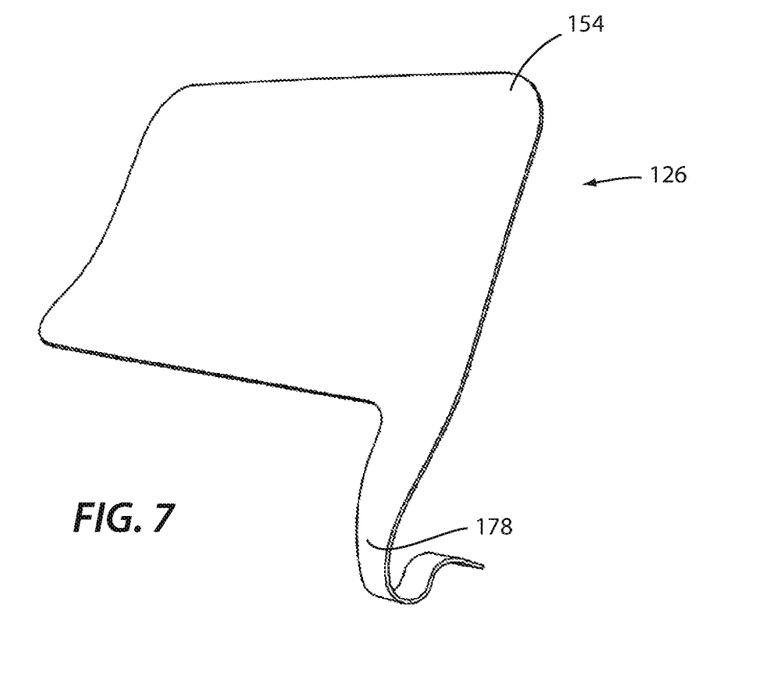
FIG. 7 is a front-perspective view of an alternative antenna useable in a variation of a rearview mirror assembly.
Figure 8:
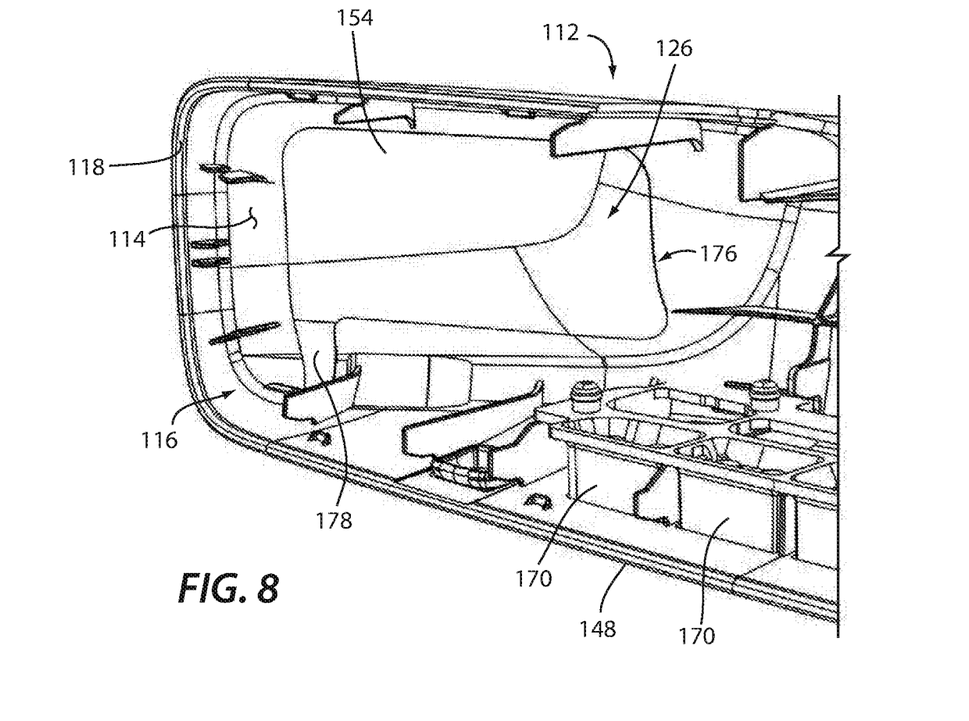
FIG. 8 is a detail view of portion of a rearview mirror assembly showing the coupling of the antenna of FIG. 7 with a control module.

An alternative embodiment of an antenna 126 useable in connection with a rearview mirror assembly 110 (which may be otherwise generally similar to rearview mirror assembly 10 shown in FIGS. 2-4) is shown in FIG. 7. In this embodiment, antenna 126 includes a body 154 of a section of metallic (or otherwise conductive) foil that may be shaped to correspond with a portion of main housing 112 adjacent interior 116 thereof. In particular, and as shown in FIG. 8, body 154 of antenna 126 may be shaped to vary in two perpendicular directions (i.e. horizontal and vertical with respect to the orientation of the rearview mirror assembly in FIG. 7) to correspond with portion 176 of interior surface 114 of main housing 112 corresponding with what may generally be understood as a front wall (i.e. with respect to the orientation of rearview mirror assembly 110 within a vehicle interior) of the interior surface 114. In an example, the use of a metallic foil for body 154 can make body 154 generally flexible or malleable, such that body 154 can be flexed or bent into a profile that generally matches, for example, portion 176 of main housing 112 (which itself, as shown, varies in both the horizontal and vertical directions), with body 154 being of an initial shape that allows for the thus-formed body 154 to fit within the space provided along portion 176. In general, positioning of antenna 126 along portions of main housing 112 within interior 116 thereof may allow for body 154 to be of a larger area than when coupled elsewhere within interior 116. In an embodiment, antenna 126 may have a body 154 of between about 1500 mm2 and 2500 mm2, and in a further embodiment about 1900 mm2. A body 154 of such a size may provide for adequate signal transmission or reception to compensate for the positioning of body 154 in a location such that an NFC enabled device may be positioned at a farther distance therefrom than when positioned elsewhere within housing 112 (such as in the example of FIGS. 1-7, discussed above).

Figure 9:
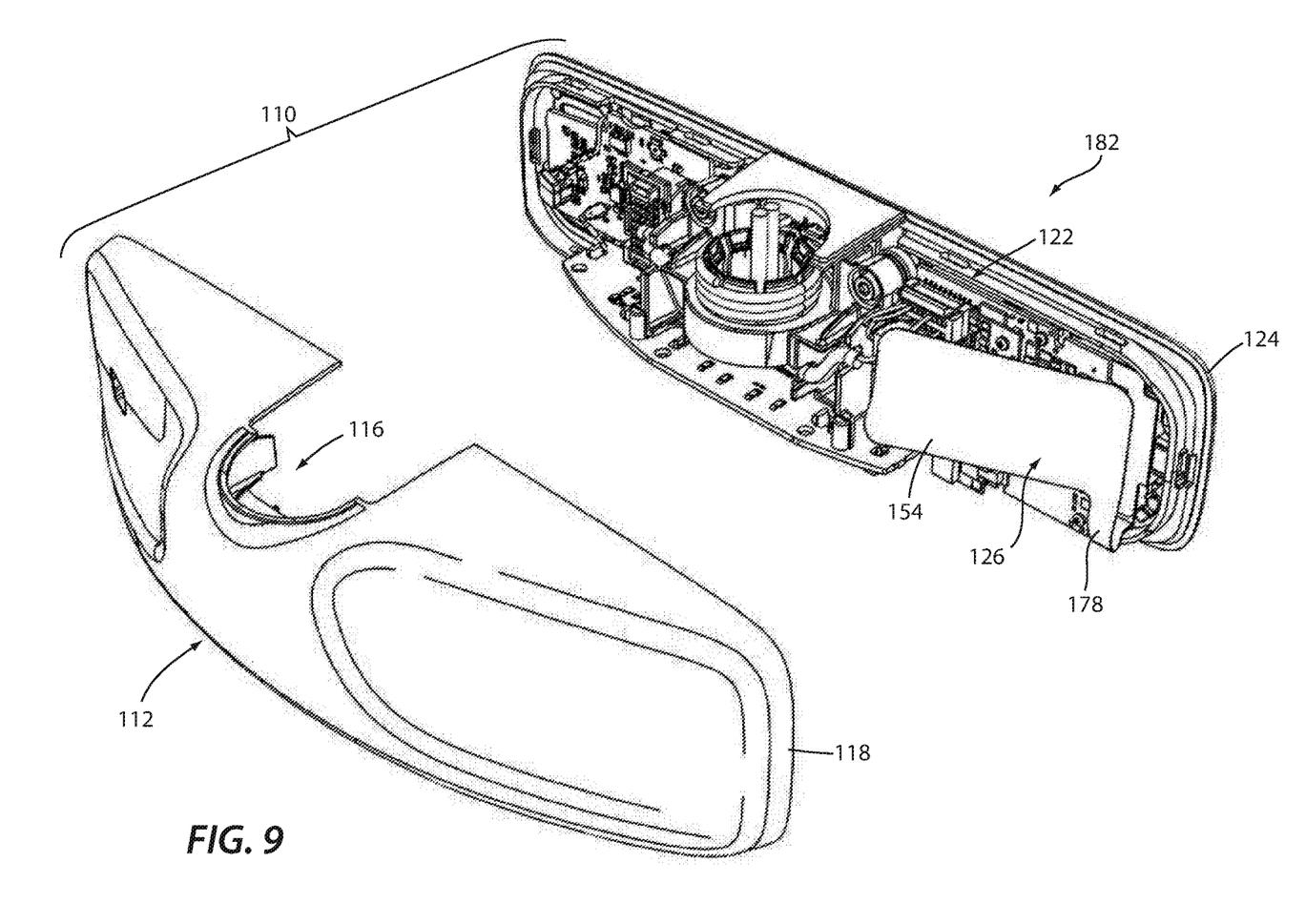
FIG. 9 is a top perspective view of a portion of a rearview mirror assembly of the present disclosure with the main housing separated from the assembly.
Figure 10:
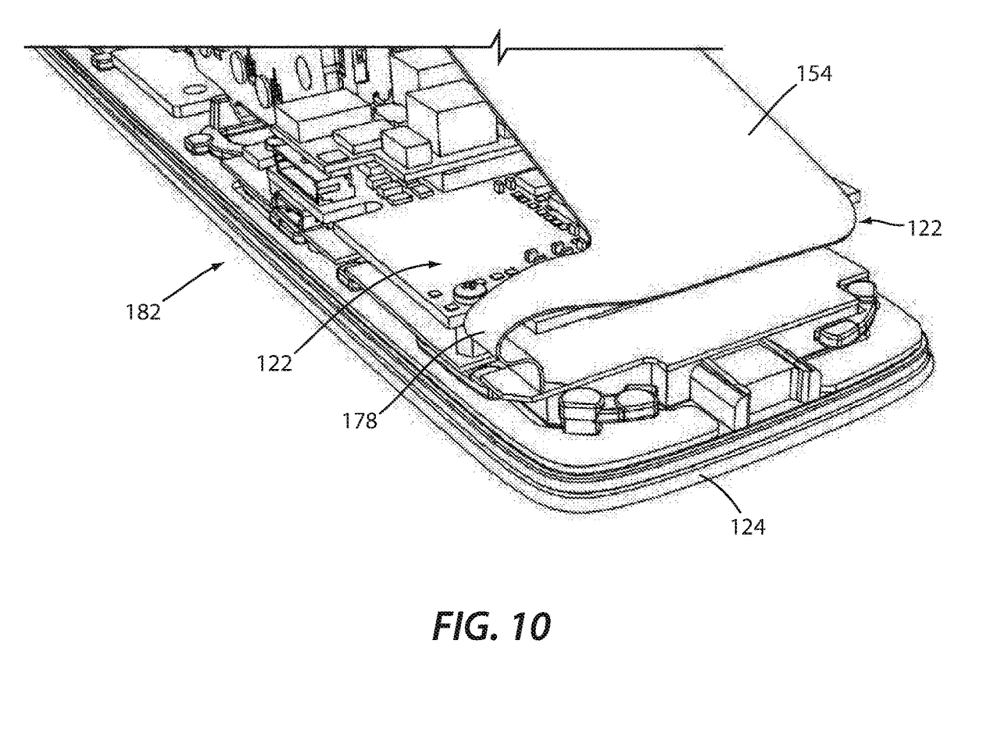
FIG. 10 is a detail view of a portion of an interior of a rearview mirror assembly showing the coupling of the antenna of FIG. 7 with a portion of a housing of the rearview mirror assembly.

As shown in FIG. 9, antenna 126 may include an extension strip 178 that extends from body 154 to couple antenna 126 with a portion of control module 122. In the example shown in FIG. 9, extension strip 178 integrally extends from body 154 and can be directly coupled with control module 122. In such an embodiment, extension strip 178 can mechanically support antenna 126 with respect to control module 122 and can be configured so as to position antenna 126 in contact with or closely adjacent to portion 176 of main housing 112. In such an arrangement, antenna 126 can be included in subassembly 182 with control module 122 and mirror 124 that can be itself assembled together before assembly with main housing 112 and incorporation into a vehicle interior (such as vehicle interior 34 in FIG. 4).

The use of a foil material for body 154, as shown in FIG. 7, may make body 154 itself unsuitable for coupling of the one or more communication chips (such as communication chips 62 coupled with body 54 in the embodiment of FIG. 5). As such, any communication chips (not shown) associated with the communication protocol of antenna 126 can be coupled with control module 122 such that it is electrically coupled with antenna 126.

In a variation, all or a portion of the depicted extension strip 178 can be replaced by a length of flex cable (not shown) that can include an electrical coupling element (e.g. a quick connect feature or the like, not shown) on an end thereof opposite body 154. Such an arrangement can allow for antenna 126 to be coupled with main housing 112 prior to assembly thereof with subassembly 182. In an example, antenna 126 can be coupled with main housing 112 using double-sided tape to adhere body 154 to portion 176 of main housing 112 within interior 116 thereof. In other examples body 154 can be coupled with portion 176 by bonding using adhesives or the like or using a snap-fit or press-fit engagement of appropriate features positioned along housing 112 with corresponding features (e.g. holes) in body 154. Subsequent to antenna 126 being coupled with main housing 112, antenna 126 can be electrically coupled with control module 122, such as by connection of a quick-connect feature, as discussed above, with a corresponding receptacle on control module 122. Subassembly 182 can then be assembled with main housing 112 to complete rearview mirror assembly 110.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A rearview mirror assembly, comprising:
a main housing defining an exterior of the assembly, a lower interior surface, an interior cavity at least partially bounded by the lower interior surface, and an open side;
a control module coupled within the interior cavity of the main housing, the control module including a printed circuit board;
a mirror coupled over the open side of the main housing, the lower interior surface being generally perpendicular with the mirror; and
an antenna, including a solid rectangular metallic substrate body having opposing planar faces and defining a length and a width of the antenna, the antenna electrically coupled with the printed circuit board of the control module and positioned within the interior cavity of the main housing, the printed circuit board having an area larger than an area of the metallic substrate body defined by the length and width thereof and the antenna being mounted along a portion of the printed circuit board sized to accommodate the length and width of the antenna and being oriented with the planar faces thereof parallel to the lower interior surface along both the length and width thereof.

2. The rearview mirror assembly of claim 1, wherein the antenna includes a communication chip mounted on the substrate body.

3. The rearview mirror assembly of claim 2, wherein the communication chip facilitates communication with an external device using the antenna according to a predetermined communications protocol.

4. The rearview mirror assembly of claim 3, wherein the predetermined communications protocol is a near-field communication protocol.

5. The rearview mirror assembly of claim 1, wherein the antenna is adhered to the printed circuit board.

6. The rearview mirror assembly of claim 1, wherein:
the main housing defines a lower outer surface; and
the antenna is positioned within the interior proximate the lower outer surface.

7. The rearview mirror of claim 1, wherein the control module includes circuitry for communicating with an external device using the antenna.

8. The rearview mirror assembly of claim 1, wherein the mirror includes a display thereon.

9. The rearview mirror assembly of claim 1, further including a plurality of buttons coupled with one of the control module of the main housing, accessible along an exterior of the housing, and extending within the interior cavity, wherein the antenna is positioned within the main housing in an area unoccupied by the plurality of buttons.

10. The rearview mirror assembly of claim 9, wherein the buttons are positioned along the main housing and operate switches mounted on the printed circuit board, the portion of the printed circuit board along which the antenna is adhered is defined in an open area adjacent the plurality of switches.

11. A rearview mirror assembly, comprising:
a main housing defining a lower exterior surface of the assembly, a lower interior surface opposite the lower exterior surface, an interior cavity at least partially bounded by the lower interior surface, and an open side;
a control module coupled within the interior cavity of the main housing;
a mirror coupled over the open side of the main housing, the lower interior surface being generally perpendicular with the mirror; and
an antenna, including a solid rectangular metallic substrate body having opposing planar faces and defining a length and a width of the antenna, the antenna electrically coupled with the control module and positioned within the interior cavity of the main housing proximate the lower outer surface and being oriented with the planar faces thereof parallel to the lower interior surface along both the length and width thereof.

12. The rearview mirror assembly of claim 11, wherein:
the control module includes a printed circuit board having an area larger than an area of the metallic substrate body defined by the length and width thereof; and
the antenna is adhered to the printed circuit board along a portion of the printed circuit board sized to accommodate the length and width of the antenna.

13. The rearview mirror assembly of claim 12, further including a plurality of buttons coupled with one of the control module or the main housing, accessible along an exterior of the housing, and extending within the interior cavity, wherein the antenna is positioned within the main housing in an area unoccupied by the plurality of buttons.

14. The rearview mirror assembly of claim 13, wherein the buttons are positioned along the main housing and operate switches mounted on the printed circuit board, the portion of the printed circuit board along which the antenna is adhered is defined in an open area adjacent the plurality of switches.

15. A rearview mirror assembly, comprising:
a main housing defining an exterior surface of the rearview mirror, an interior surface opposite the exterior surface, an interior cavity at least partially bounded by the interior surface, an open side, and a front wall portion of the interior surface spaced away from the open side, the front wall having a three-dimensional shape that varies along at least two perpendicular directions;
a control module coupled within the interior of the main housing;
a mirror coupled over the open side of the main housing; and
an antenna including a body of a flexible, metallic material and electrically coupled with the control module and positioned within the interior of the main housing along and in contact over a portion of the front wall extending continuously in the at least two perpendicular directions, the body being shaped to generally match a shape of a portion of the front wall by varying along the at least two perpendicular directions.

16. The rearview mirror of claim 15, wherein the antenna further includes an extension strip coupling the antenna body with the control module.

17. The rearview mirror of claim 16, wherein the extension strip at least partially supports the antenna body with respect to the control module.

18. The rearview mirror of claim 16, wherein the extension strip is integral with the antenna.

19. The rearview mirror assembly of claim 15, wherein at least a portion of the antenna is adhered to a portion of the interior surface of the main housing.

20. The rearview mirror of claim 15, wherein the communication chip is electrically coupled with the control module.

* * * * *